L. INGLEE.
EGG-CARRIER.

No. 186,253.   Patented Jan. 16, 1877.

UNITED STATES PATENT OFFICE.

LEWIS INGLEE, OF NEW YORK, N. Y.

IMPROVEMENT IN EGG-CARRIERS.

Specification forming part of Letters Patent No. 186,253, dated January 16, 1877; application filed December 11, 1876.

*To all whom it may concern:*

Figure 1:
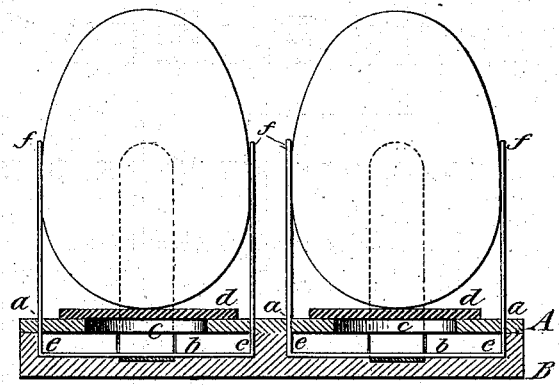
Figure 2:
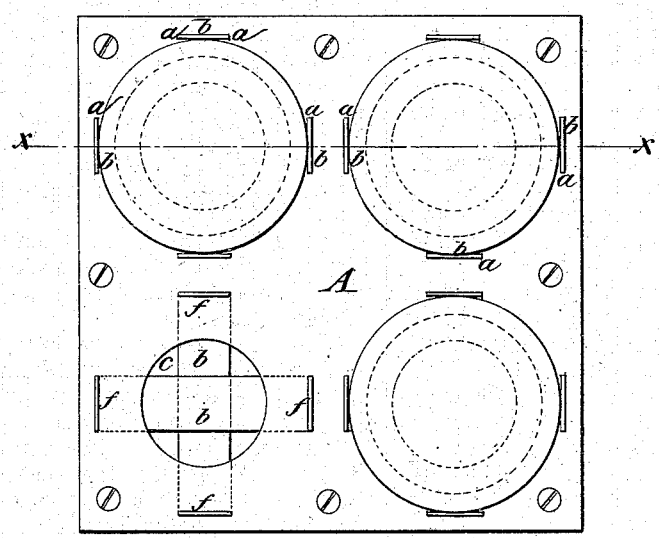

Be it known that I, LEWIS INGLEE, of the city, county, and State of New York, have invented a new and Improved Egg-Carrier, of which the following is a specification:

Figure 1 is a transverse section on line $x\ x$ in Fig. 2. Fig. 2 is a plan view.

Similar letters of reference indicate corresponding parts.

My invention relates to packing-cases for packing eggs or fruit for shipment.

The invention will first be described in connection with the drawing, and then be pointed out in the claims.

In the drawing, A is a board, through which slits $a\ a$, &c., are cut to receive the springs $b$, and in which the circular apertures $c$ are formed, over which rubber disks $d$ are secured. The springs $b$ consist of a thin ribbon of spring-steel, bent up at $e$ at each end, at right angles, and passed through the slits $a$. Two similar pieces of steel are placed at right angles, and passed through the slits, forming four projecting ends, $f$, for supporting each egg. The elastic rubber disk $d$, which is placed over the aperture $c$, between the springs, forms a yielding support for the egg at the bottom.

A board, B, recessed to receive the lower portion of the springs, is secured to the under surface of the board A, with its grain running at right angles with that of A.

Any convenient number of sets of springs may be used in each tray, and any required number of trays may be placed in a suitable packing-case. The under surface of each tray should be provided with a pad or cushion for the upper end of each egg.

Eggs are shipped in my approved carrier without breakage, and, by holding the trays toward the light, all bad eggs may be discovered.

I am aware that it is not new to support an egg in the holder between side springs and upon an elastic base; but

What I claim is—

1. An egg-holder consisting of the apertured board A, the recessed board B, the elastic disks, and the vertical springs, substantially as shown and described.

2. In an egg-holder, the combination, with the board B, having the recesses shown, of the springs $b\ b$, each bent twice at right angles, to fit and be held within said recesses, as specified.

LEWIS INGLEE.

Witnesses:
   C. SEDGWICK,
   ALEX. F. ROBERTS.